United States Patent
Shoji et al.

(10) Patent No.: US 8,035,777 B2
(45) Date of Patent: Oct. 11, 2011

(54) OPTICAL FILTER

(75) Inventors: Tatsuya Shoji, Ube (JP); Ryo Konishi, Ube (JP); Shigeru Yao, Ube (JP)

(73) Assignee: Ube Industries, Ltd., Ube (JP)

( * ) Notice: Subject to any disclaimer, the term of this patent is extended or adjusted under 35 U.S.C. 154(b) by 113 days.

(21) Appl. No.: 12/295,412

(22) PCT Filed: Mar. 29, 2007

(86) PCT No.: PCT/JP2007/056973
§ 371 (c)(1),
(2), (4) Date: Jan. 27, 2009

(87) PCT Pub. No.: WO2007/119592
PCT Pub. Date: Oct. 25, 2007

(65) Prior Publication Data
US 2009/0310067 A1     Dec. 17, 2009

(30) Foreign Application Priority Data
Mar. 30, 2006   (JP) ................................. 2006-095909

(51) Int. Cl.
*G02F 1/1335* (2006.01)
(52) U.S. Cl. .......................................... 349/104; 349/96
(58) Field of Classification Search ................. 349/96, 349/104
See application file for complete search history.

(56) References Cited

U.S. PATENT DOCUMENTS

| | | | | |
|---|---|---|---|---|
| 3,591,253 A | * | 7/1971 | De Palma | 359/453 |
| 5,583,675 A | * | 12/1996 | Yamada et al. | 349/84 |
| 5,618,592 A | | 4/1997 | Nagae et al. | |
| 5,643,471 A | * | 7/1997 | Onishi et al. | 216/23 |
| 5,877,829 A | * | 3/1999 | Okamoto et al. | 349/74 |
| 5,880,797 A | * | 3/1999 | Yamada et al. | 349/84 |
| 5,995,190 A | * | 11/1999 | Nagae et al. | 349/156 |
| 6,014,188 A | * | 1/2000 | Yamada et al. | 349/32 |
| 6,175,398 B1 | * | 1/2001 | Yamada et al. | 349/96 |
| 6,344,883 B2 | * | 2/2002 | Yamada et al. | 349/32 |
| 6,497,946 B1 | * | 12/2002 | Kretman et al. | 428/317.9 |
| 6,894,821 B2 | * | 5/2005 | Kotchick | 359/246 |
| 7,347,612 B2 | * | 3/2008 | Yue et al. | 362/629 |
| 7,745,504 B2 | * | 6/2010 | Nakayama et al. | 521/60 |
| 2008/0161442 A1 | * | 7/2008 | Nakayama et al. | 521/182 |
| 2009/0061227 A1 | * | 3/2009 | Asano et al. | 428/402 |
| 2009/0246235 A1 | * | 10/2009 | Asano et al. | 424/401 |

FOREIGN PATENT DOCUMENTS

JP    48-19257 B1    6/1973

(Continued)

OTHER PUBLICATIONS

Office Action dated Jan. 8, 2010 in corresponding CN Patent Application No. 200780019582.6.
Maxwell B. Fairbairn, Physical Models of Haidinger's Brush, Journal of the Royal Astronomical Society of Canada, XP-002499167, Dec. 1, 2001, pp. 248-251, vol. 95, No. 6, Toronto, Canada.

(Continued)

*Primary Examiner* — Rhonda Peace
(74) *Attorney, Agent, or Firm* — Knobbe Martens Olson & Bear LLP

(57) ABSTRACT

The present invention provides an optical filter comprising a crystalline polymer having a spherulite structure, particularly an optical filter comprising porous particles formed of a crystalline polymer in which single particles per se have a spherulite structure. This optical filter can convert linear polarized light to nonpolarized light close to natural light with high efficiency.

15 Claims, 5 Drawing Sheets

FOREIGN PATENT DOCUMENTS

| | | |
|---|---|---|
| JP | 54-99446 A | 8/1979 |
| JP | 1994-308496 A | 11/1994 |
| JP | 1998-10522 A | 1/1998 |
| JP | 2001-521198 A | 11/2001 |
| JP | 2003-185821 A | 7/2003 |
| WO | WO 99/21913 | 5/1999 |

OTHER PUBLICATIONS

European Search Report dated Oct. 27, 2009.
International Search Report by Japanese Patent Office dated May 15, 2007.

* cited by examiner

2 μm

OPTICAL FILTER

This application is the US National Phase under 35 U.S.C. §371 of International Application PCT/JP 2007/056973, filed Mar. 29, 2007, which claims priority to Japanese Patent Application No. 2006-095909, filed Mar. 30, 2006. The International Application was published under PCT Article 21(2) in a language other than English.

TECHNICAL FIELD

The present invention relates to an optical filter which converts polarized light to nonpolarized light. More particularly, the invention relates to an optical filter which is fitted to a liquid crystal display device such as a liquid crystal display of a liquid crystal television, a computer or a cellular phone, thereby enabling to convert linear polarized light emitted therefrom to nonpolarized light close to natural light with high efficiency.

BACKGROUND ART

In late years, because of characteristics of being thin, light in weight and having a high picture quality, a liquid crystal display device has become a display device which can compete with CRT. A liquid crystal display with multicolor and high definition or the like has been marketed. Furthermore, with the demand for large screen size and development of high-vision technique, an enlarging projection type video display device with a liquid crystal projector is being spread. As the driving principle of the liquid crystal display device, there have been a TFT type, a MIM type, a STN type, a TN type and the like. Any of these types uses a pair of polarizer, and the emitted display light is linear polarized light. Accordingly, light reaching an observer is linear polarized light.

However, as a means to reduce asthenopia caused by using a liquid crystal display for a long time, a polarizing filter or a polarized eyeglass is used in some cases. An object of the polarizing filter or the polarized eyeglass is to cut off the incoming light from the polarization component having a direction perpendicular to the transmission axis of the polarizer, and to take only the incoming light from the polarization component having a direction parallel to the transmission axis of the polarizer. However, as described above, since light emitted from the liquid crystal screen of a cellular phone or a personal computer is linear polarized light, if an angle of the polarizing filter or the polarizing eyeglass is inclined, the quantity of light is remarkably reduced and the screen becomes invisible in the extreme case, or the left and right sides look different. Such extreme problems were caused.

In order to avoid such problems, a ¼ wavelength plate for a wavelength is used, whereby linear polarized light is considered to be converted to elliptical polarized light, but it is not possible to apply this principle because the wavelength of light emitted from the display is various. Furthermore, apart from the polarizing filter, there is a technique using a cloud membrane phenomenon, in which a special metal line having a width of from 0.1 to 0.15 mm is coated on a substrate in a network structure, whereby a non-coated portion (ultrafine hole of about 0.02 mm×0.02 mm) through which light is transmitted is formed, thereby causing interference and diffraction phenomenon in the wavelength of the incoming light. However, a fine processing technology has been needed for this technique. Similarly, a filter including dispersed fine polymer particles has a little ability to make linear polarized light to nonpolarized light by scattering effect of a particle, but it has been known that there is hardly any effect when a thin film is formed.

Furthermore, whereas there has been proposed that linear polarized light is converted to nonpolarized light by means of a polymer having an amorphous structure (refer to Patent Document 1), practically the amorphous structure has only a low ability to convert linear polarized light to nonpolarized light. We found for the first time that the polymer made into a crystalline aggregate called a spherulite structure has the ability to convert linear polarized light to nonpolarized light effectively. Furthermore, whereas there has also been proposed an optical filter employing a depolarizing plate using a crystal quartz plate (refer to Patent Document 2), it is not practical to arrange the optical filter on a surface of the liquid crystal.

On the other hand, there has been proposed a liquid crystal display device using an alignment film composed of a polymer having a spherulite structure (refer to Patent Document 3). This liquid crystal display device is arranged between a polarizer and a liquid crystal layer in order to widen a viewing angle. Its purpose is different from that of the optical filter of the present invention. Furthermore, when a polymer film having a spherulite structure is used as an optical filter and linear polarized light is attempted to be converted to nonpolarized light, distortion applied in the production of a film remains in the film, and the anisotropy of refractive index is exhibited. So, it is not possible to obtain an optical filter which can uniformly convert linear polarized light to nonpolarized light similar to natural light.

Patent Document 1: Japanese Patent Laid-open No. 2003-185821
Patent Document 2: Japanese Patent Laid-open No. 1998-10522
Patent Document 3: Japanese Patent Laid-open No. 1994-308496

DISCLOSURE OF THE INVENTION

In order to solve the aforementioned problems, an object of the present invention is to provide an optical filter (a depolarizing filter) which can convert polarized light to nonpolarized light close to natural light with high efficiency.

The present invention relates to the following items:

1. an optical filter comprising a crystalline polymer having a spherulite structure;
2. The optical filter according to the above 1, comprising particles formed of the crystalline polymer in which each single particle has a spherulite structure;
3. the optical filter according to the above 2, comprising a binder resin for maintaining the particle;
4. the optical filter according to the above 3, wherein the particle is dispersed in the binder resin;
5. the optical filter according to the above 3, wherein the particle is formed on a transparent substrate as a coating film along with the binder resin;
6. the optical filter according to the above 3, wherein the particle is adhered to the transparent substrate using the binder resin as an adhesive agent;
7. the optical filter according to any one of the above 2 to 6, wherein a number average particle diameter of the particle is from 1 to 30 μm;
8. the optical filter according to any one of the above 2 to 7, wherein the particle is a porous particle having a BET specific surface area of from 0.1 to 80 m²/g;
9. the optical filter according to the above 8, wherein an average pore diameter of the particle is from 0.01 to 0.8 μm;

10. the optical filter according to the above 8 or 9, wherein Roughness Index of the porous particle is from 5 to 100;

11. the optical filter according to any one of the above 2 to 10, wherein the degree of crystallinity of the particle as measured by DSC is not less than 40%;

12. the optical filter according to any one of the above 2 to 11, wherein the ratio of the volume average particle diameter to the number average particle diameter of the particle is from 1 to 2.5;

13. the optical filter according to any one of the above 2 to 12, wherein the particle is composed of polyamide; and 14. a liquid crystal display device equipped with a light source device, a rear polarizer, a liquid crystal cell and a front polarizer, containing the optical filter according to any one of the above 1 to 13 between the front of the front polarizer or the rear of the rear polarizer and the light source device.

Effect of the Invention

The optical filter of the present invention can convert polarized light to nonpolarized light close to natural light with high efficiency. Accordingly, the optical filter is fitted to a liquid crystal display device such as a liquid crystal display of a liquid crystal television, a computer or a cellular phone, whereby linear polarized light emitted therefrom can be converted to nonpolarized light. So, even when a polarizing filter or a polarizing eyeglass is used, dark field can be eliminated. Furthermore, even when the optical filter is used alone, light can be gently dispersed so that asthenopia can be reduced.

Furthermore, since the light component emitted from the light source device contains the polarization component in some cases, the optical filter is arranged between the light source device and the rear polarizer so that it is possible to effectively produce brightness.

BEST MODE FOR CARRYING OUT THE INVENTION

Figure 1:
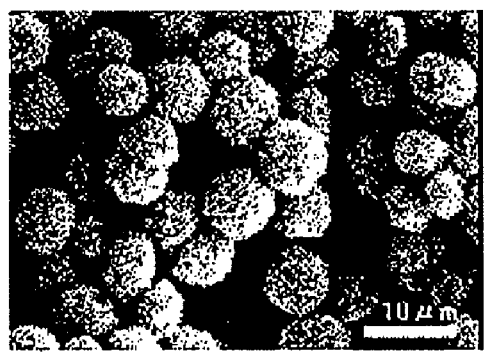
FIG. 1 is a scanning electron microscope photograph of a porous particle used in Example 1.

The optical filter of the present invention is formed by containing a crystalline polymer having a spherulite structure. The optical filter may be formed by containing particles composed of a crystalline polymer having a spherulite structure, or may be in the form of a film made of a crystalline polymer having a spherulite structure. Preferably, the optical filter is constructed such that it contains particles formed of a crystalline polymer in which single particles per se have a spherulite structure. This particle preferably has a number average particle diameter of from 1 to 30 μm and is further preferably a porous particle, and its BET specific surface area is from 0.1 to 80 $m^2/g$.

The spherulite structure is a structure specific to a crystalline polymer formed by three-dimensional isotropic or radial growth of a polymer fibril from a single core or a plurality of cores, while "single particles have a spherulite structure" refers to a spherulite structure formed by three-dimensional isotropic or radial growth of a polymer fibril from a single core or a plurality of cores near the center of one single particle.

The degree of crystallinity of the particle is preferably not less than 40%, and a polymer material capable of the crystallization up to that level can be preferably used. Further, the method for preparing particles is not particularly restricted as long as it is a method in which fine particles can be formed while developing spherulite. For example, a method including precipitating particles from a solution of a polymer material while developing spherulite and the like can be used. In the precipitation method from this solution, porous particles can be grown.

Hereinafter, preparation of porous particles will be described. As the porous particle, a polyamide porous particle will be exemplified, but indices indicating physical forms of particles such as the particle shape, particle diameter, specific surface area, pore diameter and the like described herein are also applied to particles other than polyamide.

As polyamide constituting porous particles, various known polyamides can be cited. Polyamides are obtained, for example, by ring-opening polymerization of cyclic amide or condensation polymerization of dicarboxylic acid with diamine. Examples of the monomer include crystalline polyamide obtained by subjecting cyclic amide such as ε-caprolactam, ω-laurolactam or the like to ring-opening polymerization; and polyamides obtained by subjecting an amino acid such as ε-aminocaproic acid, ω-aminododecanoic acid, ω-aminoundecanoic acid or the like to polycondensation, or subjecting dicarboxylic acid such as oxalic acid, adipic acid, sebacic acid, terephthalic acid, isophthalic acid, 1,4-cyclohexyldicarboxylic acid or the like and derivatives, and diamine such as ethylene diamine, hexamethylene diamine, 1,4-cyclohexyl diamine, m-xylylene diamine, pentamethylene diamine, decamethylene diamine or the like to polycondensation.

The aforementioned polyamide is polyamide composed of a homopolymer and a copolymer thereof, or a derivative thereof. Specific examples thereof include polyamide 6, polyamide 66, polyamide 11, polyamide 12, polyamide 610, polyamide 66/6T (T represents a terephthalic acid component) and the like. Furthermore, it may be a mixture of above polyamides. Particularly preferably used are polyamide 6 and polyamide 66.

The molecular weight of polyamide is from 2,000 to 100,000 and preferably from 5,000 to 40,000.

The polyamide porous particles are in the form of a sphere, a near sphere, a comma-shaped bead shape (C shape) or a dumbbell shape, or the mixture of these. However, it is preferably uniform particles comprising one kind of particle form in an amount of not less than 70 weight %, preferably not less than 80 weight % and further preferably not less than 90 weight %. When the amount is smaller than 70 weight %, its fluidity as a powder material is worsened and is not preferable in some cases.

The polyamide porous particle has a number average particle diameter of not less than 1 μm and preferably not more than 30 μm. When the number average particle diameter is smaller than 1 μm, it is difficult to form a spherulite structure; therefore, it is not appropriate. Furthermore, when the number average particle diameter is greater than 30 μm, there is no problem in mechanism of exhibiting depolarization. However, it has disadvantage in fabrication and manufacturing; for example, it is substantially difficult to make a smooth surface when a thin film is formed.

The BET specific surface area of the polyamide porous particle is from 0.1 to 80 m$^2$/g. When the specific surface area is smaller than 0.1 m$^2$/g, the adhesion is worsened when the particle is dispersed in a transparent resin in some cases. Furthermore, when the specific surface area is greater than 80 m$^2$/g, handleability of a coating solution is lowered when a coating film is formed.

The average pore diameter of the polyamide porous particle is preferably from 0.01 to 0.8 μm. When the average pore diameter is smaller than 0.01 μm, the adhesion is worsened when the particle is dispersed in a transparent resin in some cases. Furthermore, when the average pore diameter is greater than 0.8 μm, handling becomes difficult.

The Roughness Index (RI) of the polyamide porous particle is preferably from 5 to 100. The Roughness Index (RI) herein is defined as that represented by the ratio of the specific surface area of a porous spherical particle to the specific surface area of a smooth spherical particle of the same diameter. The Roughness Index is represented by the following equation. When the Roughness Index is smaller than 5, the adhesion is worsened when the particles are dispersed in a transparent resin in some cases. When the Roughness Index is greater than 100, handling becomes difficult.

$$RI=S/S_0 \quad \text{[Numerical Equation 1]}$$

Herein, RI is Roughness Index; S is a specific surface area [m$^2$/kg] of porous particles; and $S_0$ is a specific surface area [m$^2$/kg] of a smooth spherical particle of the same particle diameter. $S_0$ can be obtained in accordance with the following equation.

That is, when the observed number average spherical particle diameter $d_{obs}$[m] is taken as the density ρ[kg/m$^3$] of polyamide, the specific surface area $S_0$ of the smooth sphere can be represented by the following equation, $$S_0=6/(\rho d_{obs})[m^2/kg] \quad \text{[Numerical Equation 2]}$$

When polyamide is polyamide 6, the density of a crystalline phase is taken as 1,230 kg/m$^3$, while the density of an amorphous phase is taken as 1,100 kg/m$^3$.

Furthermore, the polyamide porous particle is crystalline, having the melting point of from 110 to 320° C. and preferably from 140 to 280° C. When the melting point is lower than 110° C., thermal stability is lowered.

Furthermore, it is preferable that the polyamide porous particle used in the present invention has the degree of crystallinity of not less than 40% as measured by DSC. The degree of crystallinity of polyamide is obtained according to X-ray analysis, according to DSC measurement and from the density, but the method for obtaining it according to DSC measurement is suitable. The degree of crystallinity of polyamide obtained by crystallization usually from a melt is about 30% high at the most. It is preferable that polyamide used in the present invention has the degree of crystallinity of higher than 40%. When the degree of crystallinity is low, an ability to convert linear polarized light to nonpolarized light falls; therefore, it is not preferable.

The degree of crystallinity of polyamide is calculated from the melting heat of the polyamide 6 of 45 cal/g as described in kunststoffe IV polyamide, R. Vieweg et. al, p. 218, Carl Hanger Verlag, 1966. The degree of crystallinity is calculated from the following equation, $$\chi=\Delta H_{obs}/\Delta H_m \times 100 \quad \text{[Numerical Equation 3]}$$

χ; degree of crystallinity (%)
$\Delta H_{obs}$; melting heat of sample (cal/g)
$\Delta H_m$; melting heat of polyamide (cal/g)

In the particle size distribution, the ratio of a volume average particle diameter (or volume-based average particle diameter) to a number average particle diameter (or number-based average particle diameter) of the polyamide porous particle of the present invention is preferably from 1 to 2.5. When the ratio of a volume average particle diameter to a number average particle diameter (particle size distribution index PDI) is greater than 2.5, handling of the particle as powder becomes worse.

The particle size distribution index is represented by the following equation,

Number average particle diameter:

$$Dn = \sum_{i=1}^{n} Xi/n \quad \text{[Numerical Equation 4]}$$

Volume average particle diameter:

$$Dv = \sum_{i=1}^{n} Xi^4 \bigg/ \sum_{i=1}^{n} Xi^3 \quad \text{[Numerical Equation 5]}$$

Particle size distribution index:

$$PDI=Dv/Dn \quad \text{[Numerical Equation 6]}$$

Herein, Xi is each particle diameter; and n is the number of measurements.

The polyamide porous particle can be prepared by dissolving polyamide in a good solvent, and then lowering the solubility of a solution to polyamide, and precipitating polyamide.

As a preferable method, the polyamide porous particle can be prepared according to a method which involves, using a solvent which is nonsolvent to polyamide at a low temperature and good solvent for dissolving polyamide at a high temperature, dispersing polyamide in the solvent and then raising the temperature for increasing the solubility of the solvent to polyamide to dissolve polyamide, and then lowering the temperature of the solution for decreasing the solubility of the solvent to polyamide to precipitate polyamide.

Examples of the solvent which is a nonsolvent of polyamide at a low temperature and a solvent for dissolving polyamide at a high temperature include polyhydric alcohols and a mixture thereof. Examples of the polyhydric alcohol include ethylene glycol, 1,2-propanediol, 1,3-propanediol, 1,4-butanediol, glycerin, propylene glycol, dipropylene glycol, 1,5-pentanediol, hexylene glycol and the like.

In order to accelerate dissolution in the above solvent, an inorganic salt may be added for lowering the dissolving temperature, and examples of the inorganic salt include calcium chloride, lithium chloride and the like. If an inorganic salt includes metal ion which accelerates dissolution by acting on a hydrogen bonding portion of polyamide, any salts may be used without restricting to the above-exemplified salts.

As a more preferable method, the polyamide porous particle can be prepared by using a method involving mixing a nonsovlent (B) which cannot dissolve polyamide at around room temperature with a polyamide solution (A) obtained by dissolving polyamide in a good solvent for dissolving polyamide at around room temperature, thus reducing the solubility of the solvent to polyamide.

As the good solvent of polyamide at around room temperature in the present invention, a phenol compound and a formic acid are preferred. As the phenol compound, specifically, preferably used are phenol, o-cresol, m-cresol, p-cresol, cresylic acid, chlorophenol and the like. When heated at room temperature or at a temperature of 30 to 90° C., they dissolve or accelerate dissolution of crystalline polyamide, and are, therefore, preferred. Particularly preferably used is phenol. Phenol is less toxic as compared to other solvents, and is operationally safe. Further, it is convenient because phenol is easily removed from the obtained porous fine particle.

A freezing point-lowering agent may be added to the polyamide solution (A). As the freezing point-lowering agent, a nonsolvent of polyamide can be used as long as it is in the range of not precipitating polyamide in the polyamide solution. Examples of the freezing point-lowering agent include water, methanol, ethanol, 1-propanol, 2-propanol, 1-butanol, 2-butanol, 2-methyl-1-propanol, 2-methyl-2-propanol, 1-pentanol, 1-hexanol, ethylene glycol, triethylene glycol, propylene glycol, glycerin, diglycerin and the like.

For accelerating dissolution in the above polyamide solution and enhancing the solubility of polyamide, an inorganic salt may be added, and examples of the inorganic salt include calcium chloride, lithium chloride and the like. If an inorganic salt includes metal ion which accelerates dissolution by acting on a hydrogen bonding portion of polyamide, any salts may be used without restricting to the above-exemplified salts.

The concentration of polyamide in the polyamide solution (A) is preferably in the range of 0.1 to 30 weight % and further preferably in the range of 0.2 to 25 weight %. When the ratio of polyamide in the polyamide solution exceeds 30 weight %, polyamide is difficult to be dissolved, or a uniform solution is not obtained in some cases. Furthermore, even though polyamide is dissolved, the viscosity of the solution becomes high so that handling becomes difficult; therefore, such a ratio is not preferable. When the ratio of polyamide is lower than 0.1 weight %, the polymer concentration is low, the productivity of a product becomes low; therefore, such a ratio is not preferable either.

The nonsolvent (B) of polyamide at around room temperature in the present invention is preferably compatible, at least partially, with the good solvent of the polyamide solution (A). Examples of the nonsovlent (B) include compounds selected from the group consisting of water and polyamide insoluble organic solvent. The nonsovlent (B) may be a mixture of two or more solvents. It is preferable that the nonsovlent (B) does not dissolve 0.01 weight % or higher of polyamide in the polyamide solution at a liquid temperature of 25° C.

As the polyamide insoluble organic solvent at around room temperature, alkylene glycol such as ethylene glycol, propylene glycol and the like can be used.

Other examples of the polyamide insoluble organic solvent at around room temperature include monovalent and trivalent alcohols. As the monovalent alcohol, monovalent alcohols having 1 to 6 carbon atoms are preferable. The monovalent alcohol may have a straight chain or branch chain. Examples of the monovalent alcohol include methanol, ethanol, 1-propanol, 2-propanol, 1-butanol, 2-butanol, 2-methyl-1-propanol, 2-methyl-2-propanol, 1-pentanol, 1-hexanol, ethylene glycol, triethylene glycol and propylene glycol. As the trivalent alcohol, glycerin can be cited. Furthermore, as ketone, acetone can be exemplified.

When polyamide is polyamide 6, the nonsovlent (B) is preferably a mixture containing water and polyamide insoluble solvent (preferably monovalent alcohol). When polyamide is polyamide 12, the nonsolvent (B) is a mixture containing alkylene glycol and polyamide insoluble organic solvent (preferably trivalent alcohol) other than alkylene glycol thereto.

In order to produce polyamide porous fine particles, there can be used a method that includes mixing the solution (A) with the nonsovlent (B) to form a temporarily uniform mixed solution and allowing them to stand. Resultantly, the precipitation of polyamide porous particles is obtained by this procedure. The liquid temperature of the mixed solution when polyamide porous particles are precipitated is preferably in the range of 0 to 80° C. and particularly preferably in the range of 20 to 40° C.

The viscosity of the mixed solution may be enhanced by adding a thickening agent to the mixed solution of the polyamide solution (A) and the nonsovlent (B) of polyamide for preventing aggregation of the precipitated polyamide particles. As the thickening agent, polyalkylene glycol having a number average molecular weight of not less than 1,000 (particularly, in the range of 1,100 to 5,000) is exemplified. Examples of polyalkylene glycol include polyethylene glycol and polypropylene glycol. The method of adding a thickening agent may be any of a method involving mixing the polyamide solution with the nonsovlent (B) and at the same time adding a thickening agent or a method involving adding a thickening agent to the mixed solution immediately after the preparation. Two or more polyalkylene glycols may be used in combination.

The order of adding the polyamide solution and the nonsolvent is not particularly restricted as long as uniformity of the solution is maintained.

In the present invention, the prepared polyamide porous fine particle can be subjected to solid-liquid separation by a method such as decantation, filtration, centrifugation or the like.

In the present invention, the prepared polyamide porous fine particle is brought contact with the polyamide nonsolvent at a temperature of not less than 40° C. which is compatible with a good solvent of the polyamide solution (A) at a temperature of not less than 40° C., whereby the good solvent of (A) can be extracted and removed from the polyamide porous fine particle.

Examples of the polyamide nonsolvent which is used for extracting and removing the good solvent of the polyamide solution (A) include compounds selected from the group consisting of aliphatic alcohol, aliphatic or aromatic ketone, aliphatic or aromatic hydrocarbon and water. This nonsolvent may be a mixture of two or more kinds, and it is preferable that this nonsolvent does not dissolve 0.01 weight % or higher of polyamide at a liquid temperature of 40 degrees centigrade.

Examples of the aliphatic alcohol include mono-valent aliphatic alcohol having 1 to 3 carbon atoms such as methanol, ethanol, 1-propanol, 2-propanol and the like.

Examples of the aliphatic ketone include acetone and methylethyl ketone. Examples of the aromatic ketone include acetophenone, propiophenone and butyrophenone.

Examples of the aromatic hydrocarbon include toluene and xylene. Examples of the aliphatic hydrocarbon include heptane, hexane, octane and n-decane.

The optical filter of the present invention has spherulites of the crystalline polymer, and at least a part of the layer of the optical filter usually contains spherulites of the crystalline polymer. The optical filter may be a film of the crystalline polymer forming a spherulite structure, but it preferably contains particles forming the above spherulite structure. It is further preferable that the optical filter has the aforementioned particles and binder resin for maintaining particles. As typical embodiments of the optical filter, there can be exemplified (a) an embodiment obtained by the method including dispersing particles in a transparent resin using the transparent resin as a binder resin and form it into the form of a plate or a film, (b) an embodiment obtained by the method including forming a coating film on a substrate from particles and a binder resin in combination, (c) an embodiment obtained by the method including adhering particles to a substrate using a binder resin as an adhesive agent and the like.

In the above embodiment (a), as the transparent resin for dispersing particles, there can be exemplified, for example, methacrylic resins, polystyrene resins, polycarbonate resins, polyester resins, polyolefin resins including cyclic polyolefin resins and the like. In case that the light scattering is intended, the transparent resin is preferably a material having a refractive index different from that of (porous) particles. In case that the light scattering is intended to be suppressed, it is preferably the same material as (porous) particles or a material having a refractive index close to that of (porous) particles.

Particles are preferably combined at a ratio of 0.1 to 60 weight % based on the total of the transparent resin and the particles.

Furthermore, when a coating film containing particles of the above embodiment (b) is formed on the transparent substrate, there is used a method in which particles are mixed and dispersed in the transparent resin (transparent paint), the mixture is coated on a surface of the transparent substrate by using a means such as a spray method, a dipping method, a curtain flow method, a roll coater method, printing or the like, and is subjected to irradiation with ultraviolet rays or heating for curing. Examples of the binder resin used for the transparent paint include acrylic resins, polyester resins, urethane resins and the like.

As the transparent substrate, there can also be used an inorganic transparent plate such as a glass plate, in addition to a transparent resin plate such as methacrylic resins, polystyrene resins, polycarbonate resins, polyester resins, polyolefin resins including cyclic polyolefin resins or the like.

In forming an optical filter, as above embodiment (c), the particles may be directly adhered to the transparent substrate using a binder resin (a known adhesive agent or the like).

The optical filter of the present invention per se may be installed on the liquid crystal display screen and used accordingly. The filter of the present invention exhibits an action of anti-reflection and/or anti-glare without requiring surface post-processing in some of the embodiments.

Or, a transparent base material may be adhered to the outer surface of the optical filter as a protective film. The transparent base material to be used is not particularly restricted as long as it is transparent, but examples thereof include polycarbonate resins, methacrylic resins, PET resins, polystyrene resins, polyolefin resins including cyclic polyolefin resins, transparent glasses and the like. Furthermore, the outer surface of the transparent base material is preferably subjected to anti-reflection process and/or anti-glare process and/or hard coat process. Furthermore, the method of adhering the polymer film to the transparent base material is not particularly restricted, and known methods can be used.

In the present invention, the liquid crystal display device equipped with the above optical filter refers to those having a light source device, a rear polarizer, a liquid crystal cell and a front polarizer as a basic constitution. While there are various systems/structures depending on the mechanism of the liquid crystal cell, the display device comprises these four components of at least a light source device, a polarizer, a liquid crystal cell and a polarizer in this order, and may comprise optionally other components such as an optical compensation plate, a color filter or the like between, in front of or rear of the four components. Furthermore, any of these components may be well-known or common, and the components are not particularly restricted. Incidentally, since the polarizers are installed at two positions in these constitutions, for discrimination purpose, in this specification, a plate between the light source device and the liquid crystal cell is called a rear polarizer, and a plate present in the front display side of the liquid crystal cell is called a front polarizer.

The optical filter of the present invention can be arranged further in the front of the front polarizer. In the liquid crystal display device, depending on its structure, an optical compensation plate, a color filter or the like is arranged in the front than the liquid crystal cell. When a color filter is used, the optical filter can be arranged at the front side than the color filter. When an optical compensation plate is used, the optical filter may be arranged either at the front side or the rear side of the optical compensation plate.

Furthermore, the optical filter of the present invention may be arranged between the light source device and the rear polarizer. In the liquid crystal display device, depending on its method, a diffusion film or the like is arranged in the rear side than the liquid crystal cell. When a diffusion film or the like is used, the optical filter may be arranged either in the front or at the rear side of the diffusion film.

EXAMPLES

Examples are now illustrated below. However, the present invention is not restricted to these Examples.

Furthermore, physical properties (particle diameter, specific surface area, average pore diameter, degree of crystallinity and the like) of a porous particle were measured in the following manner.

(Average Particle Diameter and Particle Size Distribution Index)

The dried polyamide particle was photographed with a scanning electron microscope and diameters of 100 particles were measured for obtaining an average, and a number average particle diameter was calculated. Furthermore, a volume average particle diameter and a particle size distribution index were calculated from the equation as described above.

(Pore Size Distribution)

It was measured with a mercury porosimeter. It was measured in the measuring range of 0.0034 to 400 μm. An average pore diameter was obtained.

(Specific Surface Area and Roughness Index)

The measurement of specific surface area of the polyamide particle was carried out by measuring 3 points by the BET method according to nitrogen adsorption. A Roughness Index was obtained from this value in accordance with the aforementioned equation.

(Degree of Crystallinity)

The degree of crystallinity of polyamide was measured by DSC (Differential Scanning Calorimetry). It was measured according to the method as described above.

(Evaluation of the Depolarization Ability)

Figure 6:
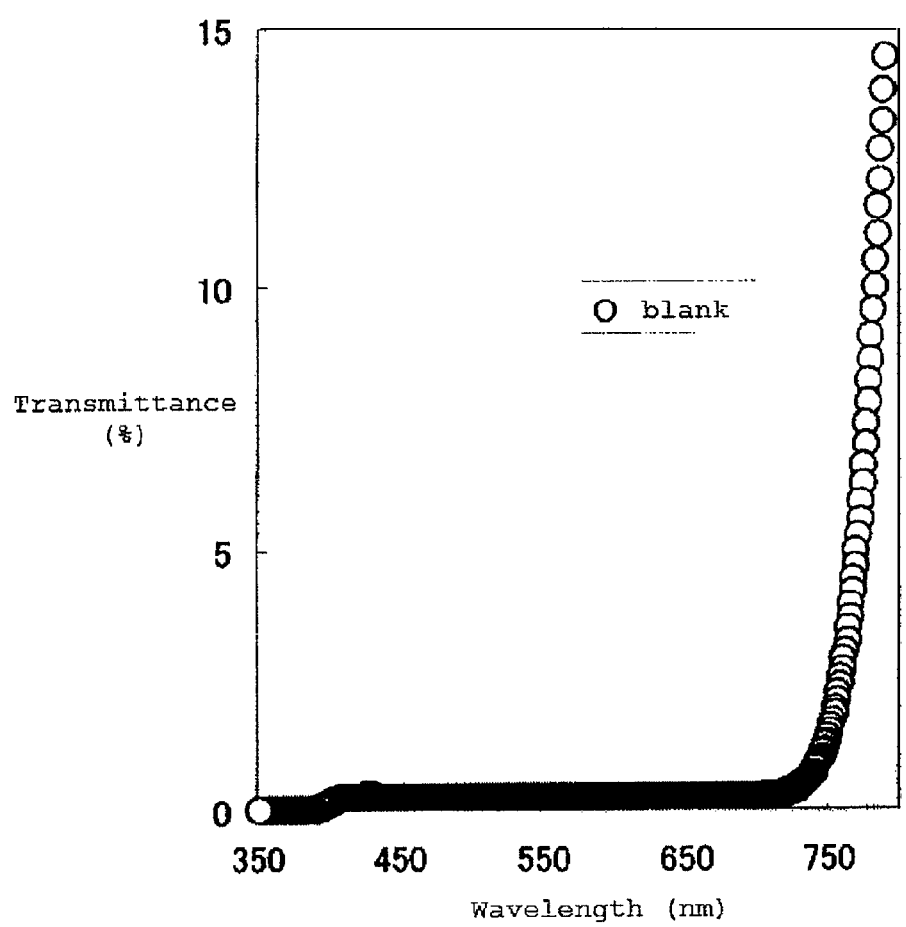
FIG. 6 is a graph illustrating the wavelength dependence of the transmittance when the orientation axes of the polarizing films used for the evaluation of the depolarization ability are arranged perpendicular to each other.

The depolarization ability of a polyamide porous fine particle-dispersed sample was evaluated using a UV-visible spectrophotometer V-570 manufactured by JASCO Corporation. An integrating sphere was installed at a detection unit, two pieces of polarizing films were installed at the inlet of the detection unit such that two polarization axes were perpendicular to each other, and then the optical filter of the sample was intervened between two pieces of polarizing films for evaluating the depolarization ability according to the transmittance in the wavelength range of 350 to 800 nm. Transmittance characteristics of the blank when there is not any optical filter of the sample are shown in FIG. 6.

(Preparation of Porous Particles)

To a solution containing phenol and methanol at a mass ratio of 9:1 was added polyamide 6 (molecular weight 13,000) for dissolving, whereby a polyamide 6 solution of polyamide 6 with a concentration of 5 weight % was prepared. To this nylon solution was added a mixed solution of methanol and water mixed at a ratio of 7:0.5. The temperature was room temperature. The resulting mixture was allowed to stand for 24 hours for completing precipitation. Thereafter, a polymer was isolated by centrifugation, and then washed with methanol of 50° C. in an amount of 100 times of fine particles while subjecting to centrifugal separation spin-dry.

Figure 2:
FIG. 2 is a cross-sectional scanning electron microscope photograph of a porous particle used in Example 1.
Figure 3:
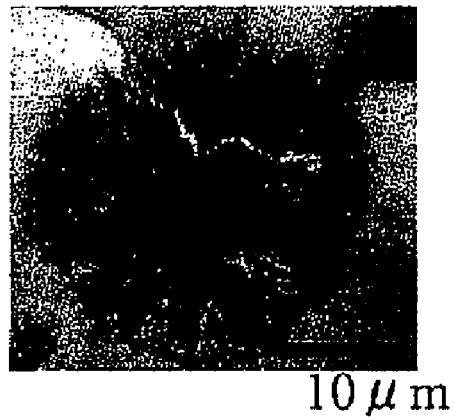
FIG. 3 is a cross-sectional transmission electron microscope photograph of a porous particle used in Example 1.

The obtained polymer particles were observed with a scanning electron microscope and as a result, they were a relatively uniform porous particle of a spherical shape having a number average particle diameter of 10.01 μm and a volume average particle diameter of 13.76 μm. In addition, an average pore diameter was 0.05681 μm, PDI was 1.36, a specific surface area was 21.4 m$^2$/g, a Roughness Index RI was 42.1, and the degree of crystallinity of the polymer particle was 56%. It was found that in this porous particle, as shown in FIGS. 1, 2 and 3, nylon fibrils were grown three-dimensionally and radially from a single core or a plurality of cores in the center, and single particles per se had a spherulite structure.

Example 1

To 99.46 weight parts of methyl methacrylate monomer were added 0.34 weight parts of 2-2'-azobis(isobutyronitrile) (AIBN) as a radical polymerization initiator and 0.20 weight parts of 1-dodecanethiol (n-lauryl mercaptan) (n-LM) as a chain transfer agent, and then 1.5 weight parts of the above polyamide porous particle was added, stirred and thermal-polymerized to prepare a plate-like optical filter having a thickness of about 0.5 mm in which the polyamide porous particles are uniformly dispersed.

Example 2

Figure 7:
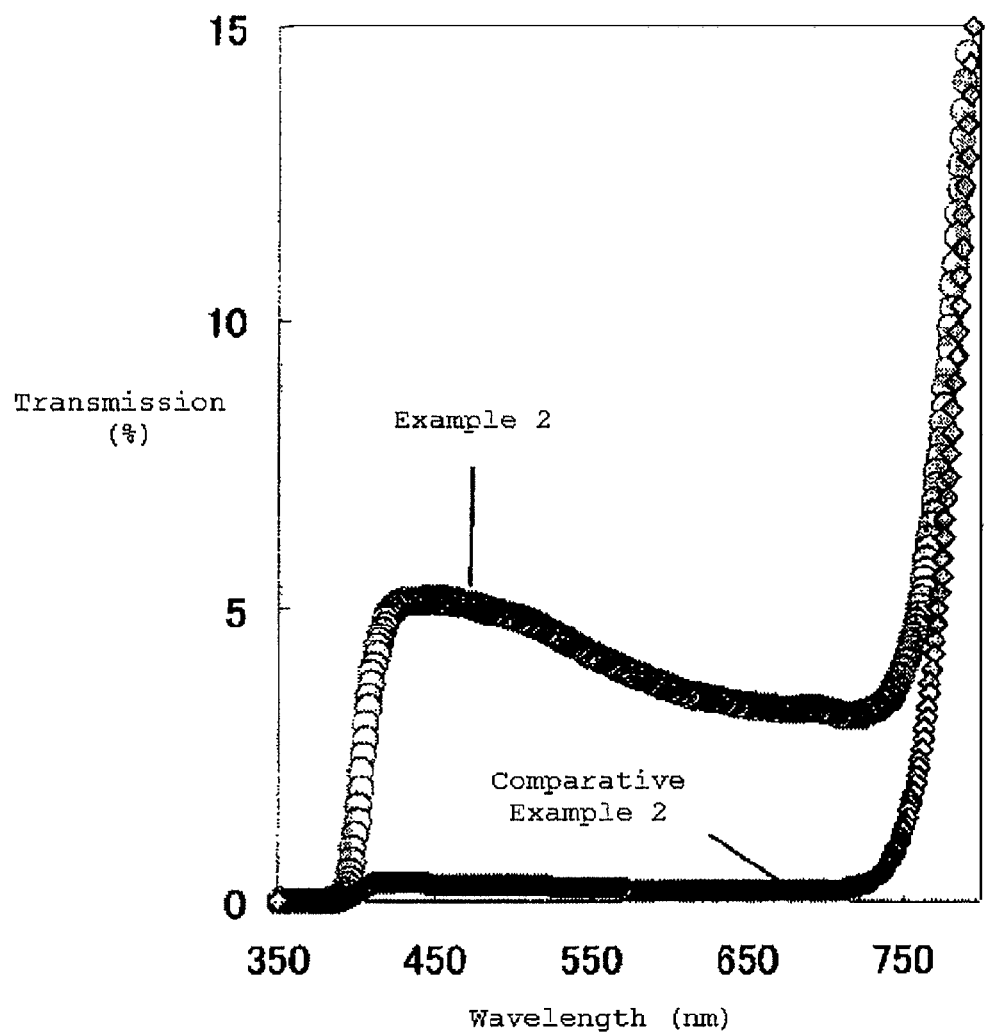
FIG. 7 shows the results from evaluation of the depolarization ability of optical filters which are respectively prepared in Example 1 and Comparative Example 1 (Example 2, Comparative Example 2), and is a graph illustrating the wavelength dependence of the transmission.

The evaluation results of the depolarization ability of the optical filter obtained by the method of Example 1 are shown in FIG. 7.

Example 3

The following procedure was conducted in order to confirm that the optical filter obtained according to Example 1 converted linear polarized light to the same nonpolarized light as natural light with high efficiency.

A polarizing film was placed on a liquid crystal display. Then, it was confirmed that when a polarization axis of the liquid crystal display and an optical axis of the polarizing film were in agreement, it gave a bright field, and when the polarization axis was slanted 90 degrees to the right or left from the optical axis at the bright field, it gave a completely dark field.

Next, the aforementioned plate-like sample was intervened between the liquid crystal display and the polarizing film and as a result, it was confirmed that images on the liquid crystal display could be surely viewed even in a state that the polarizing film was slanted 90 degrees to the right or left from the optical axis at the bright field, thus eliminating the dark field. It was found that the optical filter of the present invention could convert linear polarized light to nonpolarized light with high efficiency.

Example 4

A commercial acrylic binder solution (Acridine C) was double diluted using IPA, and then the above polyamide porous fine particles corresponding to 10 weight parts based on the binder component in the binder solution were dispersed, followed by formation of a film on a polycarbonate substrate to prepare an optical filter having a thickness of about 45 μm containing the polycarbonate substrate.

Example 5

Figure 8:
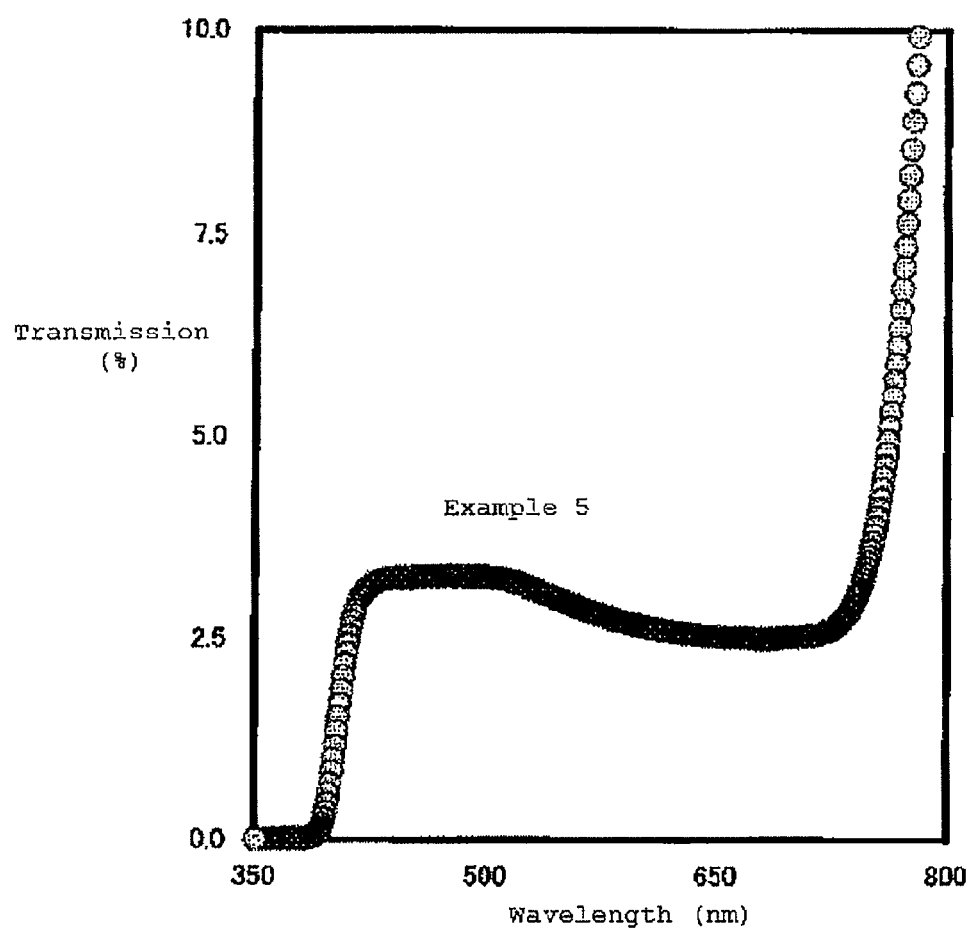
FIG. 8 shows the results from evaluation of the depolarization ability of the optical filter prepared in Example 4 (Example 5), and is a graph illustrating the wavelength dependence of the transmission.

The evaluation results of the depolarization ability of the optical filter obtained by the method of Example 4 are shown in FIG. 8.

Comparative Example 1

Figure 4:
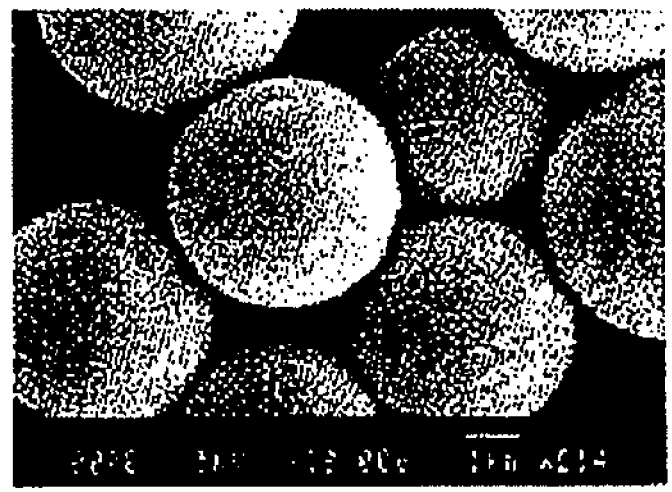
FIG. 4 is a scanning electron microscope photograph of a spherical particle used in Comparative Example 1.
Figure 5:
FIG. 5 is a cross-sectional transmission electron microscope photograph of a spherical particle used in Comparative Example 1.

A sample was prepared in the same manner as in Example 1, except that a spherical particle of polyamide 12 obtained by a known preparation method was used. A scanning electron microscope photograph and a transmission electron microscope photograph are respectively shown in FIGS. 4 and 5.

Comparative Example 2

In the same manner as in Example 2, the evaluation results of the depolarization ability of the optical filter prepared in Comparative Example 1 are shown in FIG. 7.

Comparative Example 3

The optical filter of Comparative Example 1 was intervened between the liquid crystal display and the polarizing film in the same manner as in Example 3. As a result, when the polarizing film was slanted 90 degrees to the right or left from the optical axis at the bright field, it gave a completely dark field; therefore, the dark field was not improved. It was found that since the degree of crystallinity of the spherical particle was low and good spherulites were not produced, linear polarized light could not be converted to nonpolarized light.

The invention claimed is:

1. An optical filter comprising a crystalline polymer having a spherulite structure, wherein the optical filter is configured to allow a depolarized light to pass through and to depolarize a polarized light by filtering the polarized light.

2. The optical filter according to claim 1, comprising particles formed of a crystalline polymer in which each single particle have a spherulite structure.

3. The optical filter according to claim 2, comprising a binder resin for maintaining the particle.

4. The optical filter according to claim 3, wherein the particle is dispersed in the binder resin.

5. The optical filter according to claim 3, wherein the particle is formed on a transparent substrate as a coating film along with the binder resin.

6. The optical filter according to claim 5, wherein the particle is adhered to the transparent substrate using the binder resin as an adhesive agent.

7. The optical filter according to claim 2, wherein a number average particle diameter of the particle is from 1 to 30 μm.

8. The optical filter according to claim 2, wherein the particle is a porous particle having a BET specific surface area of from 0.1 to 80 m$^2$/g.

9. The optical filter according to claim 8, wherein an average pore diameter of the particle is from 0.01 to 0.8 μm.

10. The optical filter according to claim 8, wherein a Roughness Index of the porous particle is from 5 to 100.

11. The optical filter according to claim 2, wherein the degree of crystallinity of the particle as measured by DSC is not less than 40%.

12. The optical filter according to claim 2, wherein the ratio of the volume average particle diameter to the number average particle diameter of the particle is from 1 to 2.5.

13. The optical filter according to claim 2, wherein the particle comprises polyamide.

14. A liquid crystal display device equipped with a light source device, a rear polarizer, a liquid crystal cell and a front polarizer, the liquid crystal display device comprising the optical filter according to claim 1 between the front of the front polarizer or the rear of the rear polarizer and the light source device.

15. A liquid crystal display device equipped with a light source device, a rear polarizer, a liquid crystal cell and a front polarizer, the liquid crystal display device comprising the optical filter according to claim 2 between the front of the front polarizer or the rear of the rear polarizer and the light source device.

* * * * *

UNITED STATES PATENT AND TRADEMARK OFFICE
CERTIFICATE OF CORRECTION

PATENT NO. : 8,035,777 B2  
APPLICATION NO. : 12/295412  
DATED : October 11, 2011  
INVENTOR(S) : Tatsuya Shoji et al.

It is certified that error appears in the above-identified patent and that said Letters Patent is hereby corrected as shown below:

In Column 6, Line 6, change "et. al," to --et al.,--.

In Column 7, Line 7, change "nonsovlent" to --nonsolvent--.

In Column 7, Line 55, change "nonsovlent" to --nonsolvent--.

In Column 7, Line 57, change "nonsovlent" to --nonsolvent--.

In Column 7, Line 58, change "nonsovlent" to --nonsolvent--.

In Column 8, Line 8 (Approx.), change "nonsovlent" to --nonsolvent--.

In Column 8, Line 18 (Approx.), change "nonsovlent" to --nonsolvent--.

In Column 8, Line 27, change "nonsovlent" to --nonsolvent--.

In Column 8, Line 35, change "nonsovlent" to --nonsolvent--.

In Column 8, Line 62, change "mono-valent" to --monovalent--.

Signed and Sealed this  
Eighth Day of January, 2013

David J. Kappos  
*Director of the United States Patent and Trademark Office*